Aug. 19, 1952 J. O. E. JOHANSSON 2,607,125
MEASURING DEVICE
Filed June 18, 1949
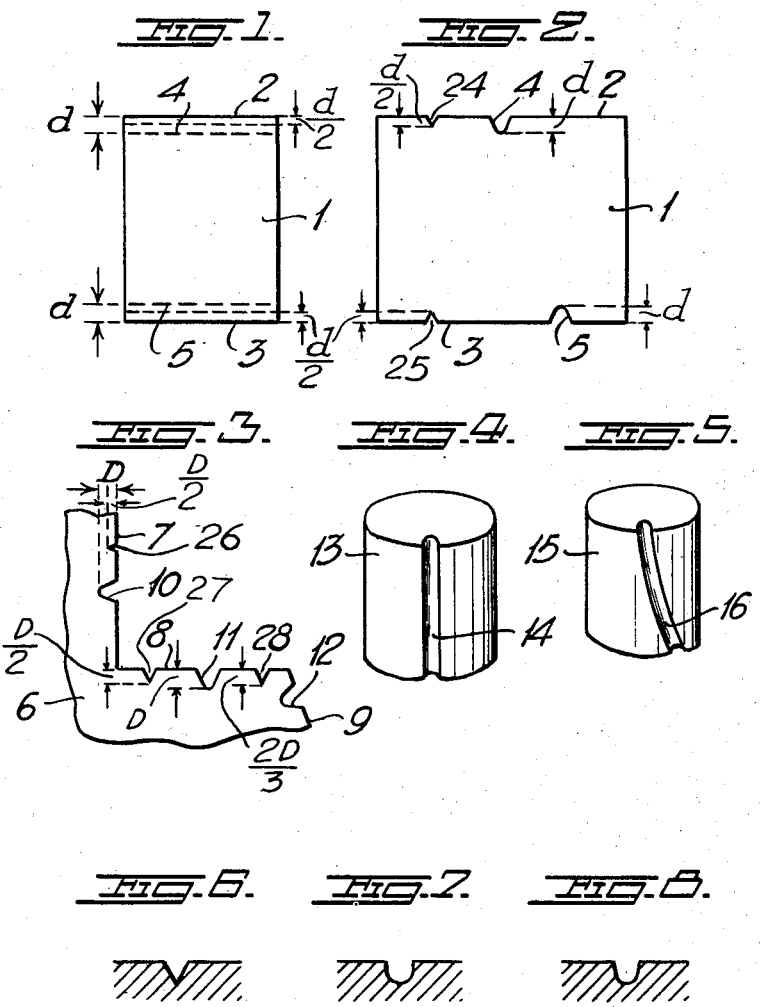
Inventor.
John Olof Edvard Johansson
by W. Bay and Jones
Attorney

UNITED STATES PATENT OFFICE 2,607,125

MEASURING DEVICE

John Olof Edvard Johansson, Eskilstuna, Sweden, assignor to Aktiebolaget C. E. Johansson, Eskilstuna, Sweden, a company of Sweden Application June 18, 1949, Serial No. 100,060
In Sweden June 21, 1948

8 Claims. (Cl. 33—168)

The present invention relates to measuring devices such as gauge blocks, having one or more reference surfaces which are used in measuring, gauging or the like operations and during use are exposed to abrasive wear. The object of the invention is to make possible a convenient, rapid and reliable observation of the wear of such reference surfaces without the use of expensive testing instruments, the use of which takes much time.

According to the primary feature of the invention each reference surface is provided with one or more grooves of a depth which bears a determined relationship to the permissible wear of the surface, so that this amount of wear can be ascertained by direct observation of the grooves with the naked eye. To facilitate observation the sides and bottom of the grooves can advantageously be coloured, for example in a colour strongly contrasting with that of the reference surface. As regards the depth of the grooves, in the case for example of end measurement gauge blocks for use in combination, which are provided with two opposite, parallel end reference surfaces, the depth may be equal to half the total permissible wear of the device, and in the case of measuring devices or gauges which are provided with single reference surfaces, the depth may be equal to the total permissible wear. The grooves can be of various cross sectional forms, for example of V-form, U-form or parabolic form, and in cases in which several grooves are provided in the same surface, they may be of different depths within the maximum corresponding to the permissible wear.

Devices embodying the invention are shown by way of example in the accompanying drawing.

Figures 1 and 2 show an end measurement gauge block of a combination set, grooved in accordance with the invention, seen from two sides at right angles, Figure 3 shows part of a gauge having a plurality of measuring or gauging surfaces, Figures 4 and 5 show plug gauges provided with grooves of different forms, and Figures 6, 7 and 8 show three different forms of groove cross-section.

In all figures, the grooves are shown on a greatly exaggerated scale for the sake of clearness.

The end measurement block 1 shown in Figures 1 and 2 has in the usual way two opposite, parallel and plane reference surfaces 2 and 3 which are a definite distance apart which is the measuring value of the block. In accordance with the invention each of these reference surfaces 2 and 3 is provided across it with a groove 4, 5 respectively of approximately V-form cross section. The sides and bottom of the grooves can advantageously be coloured in a colour which strongly contrasts with that of the reference surface. The two grooves are of the same depth $d$ and this depth is in this case equal to half the permissible total wear of the gauge block. If the permissible wear of the block is for example 0.006 mm., the depth $d$ should be 0.003 mm. As the measuring surfaces gradually wear in use, so the grooves gradually disappear, and when they have completely disappeared, as can readily be observed with the naked eye, the gauge block has reached a condition in which it should be taken out of use. In this way time-consuming inspection measurements of the gauge block are eliminated.

If each reference surface is provided with a plurality of grooves, these can with advantage be made of different depths within the permissible range of wear so that they will disappear one after another. If the depth of the various grooves is known, the stages of wear can easily be observed. To illustrate this arrangement each of the reference surfaces 2 and 3 is shown as provided with an additional groove 24 and 25, respectively, the depth of each of these grooves being $$\frac{d}{2}$$

i. e. half the depth of the grooves 4 and 5.

The gauge shown in Figure 3 has three plane measuring or gauging surfaces 7, 8 and 9, which are provided each with a groove 10, 11, 12 respectively. The depth D of these grooves will in this case advantageously be made equal to the whole of the permissible wear. Each of the measuring surfaces 7 and 8 are shown as provided with an additional groove 26 and 27, respectively, the depth of each of which is $$\frac{D}{2}$$

i. e. half the depth of the grooves 10 and 11, and the surface 8 is shown as provided with a third groove 28 the depth of which is $$\frac{2D}{3}$$

i. e. two-thirds of the depths of the groove 11.

The cylindrical plug gauge 13 illustrated in Figure 4 is provided on one side with a straight groove 14 which extends along a generatrix of the body of the gauge, while the gauge body 15 illustrated in Figure 5 is provided with a curved groove 16.

Figure 6 shows as an example a groove with a V-form cross-section, Figure 7 a groove with a U-form cross-section, and Figure 8 a groove with a parabolic cross-section.

The embodiments above described and illustrated in the drawing are only to be regarded as examples and can naturally be altered in their details in various ways within the scope of the accompanying claims.

I claim:

1. A measuring device having at least one reference surface exposed to abrasive wear in use, said reference surface being provided with at least one groove of a depth which bears a determined relationship to the permissible wear of the surface, so that the amount of wear can be ascertained by direct observation of the groove.

2. A measuring device as defined in claim 1, in which the sides and bottom of the groove are coloured.

3. A measuring device as defined in claim 1, in which the sides and bottom of the groove are coloured in a colour strongly contrasting with that of the reference surface.

4. A measuring device as defined in claim 1, in which the groove is of V-form cross-section.

5. A measuring device having a single reference surface exposed to abrasive wear in use, said reference surface being provided with at least one groove having a depth equal to the whole of the permissible wear of said surface, whereby the amount of wear of said surface can be ascertained by direct observation of said groove.

6. A measuring device having a single reference surface exposed to abrasive wear in use, said reference surface being provided with a plurality of grooves, one of said grooves having a depth equal to the whole of the permissible wear of said surface, and the other grooves being of different and less depths, whereby the amount of wear of said surface can be ascertained by direct observation of the grooves.

7. A measuring device having two opposite reference surfaces exposed to abrasive wear in use, each of said reference surfaces being provided with at least one groove having a depth equal to half the permissible total wear of said device, whereby the amount of wear of said device can be ascertained by direct observation of said grooves.

8. A measuring device having two opposite reference surfaces exposed to abrasive wear in use, each of said reference surfaces being provided with a plurality of grooves, one of said grooves in each surface having a depth equal to half the permissible total wear of the device, and the other grooves being of different and less depths, whereby the amount of wear can be ascertained by direct observation of said grooves.

JOHN OLOF EDVARD JOHANSSON.

REFERENCES CITED

The following references are of record in the file of this patent:

UNITED STATES PATENTS

| Number | Name | Date |
| --- | --- | --- |
| 315,962 | Ross | Apr. 14, 1885 |
| 1,655,905 | Kempton | Jan. 10, 1928 |
| 2,298,989 | Oswin | Oct. 13, 1942 |
| 2,355,007 | Mitchell | Aug. 1, 1944 |
| 2,410,888 | Lucy | Nov. 12, 1946 |
| 2,420,359 | Dasher | May 13, 1947 |
| 2,517,319 | Jenkin | Aug. 1, 1950 |

FOREIGN PATENTS

| Number | Country | Date |
| --- | --- | --- |
| 398,178 | Great Britain | 1933 |
| 596,103 | Great Britain | Dec. 29, 1947 |